United States Patent Office 2,997,393
Patented Aug. 22, 1961

2,997,393
ANIMAL GROWTH PROMOTANT AND
FEED COMPOSITION
John L. Schmidt, Highland Park, Henry S. Perdue, Lake Bluff, and Glenn F. Lambert and Jonathan P. Miller, Waukegan, Ill., assignors to Abbott Laboratories, North Chicago, Ill., a corporation of Illinois
No Drawing. Filed Nov. 17, 1958, Ser. No. 774,158
9 Claims. (Cl. 99—2)

This invention relates to a method of raising animals and to feed compositions for use therein. More particularly, this invention concerns the acceleration of growth of animals by incorporating in their feed certain amounts of 1-(p-chlorobenzhydryl)-4-methylpiperazine salt, the hydrochloride salt being sold under the trademark Di-Paralene ®.

Successful animal husbandry is contingent upon the rapid development and growth of the animal. The shorter the period of development can be made, the larger will be the return and the margin of profit. This is especially true in the raising of chickens, where eggs as well as the bird are a product. The faster the chickens reach the egg-laying stage, the sooner a profit will be realized.

It is an object of this invention to provide a method of promoting growth of animals and accelerating weight gaining.

It is a further object of this invention to provide a more profitable method of raising animals.

Other objects of the invention will be apparent from the detailed description and claims to follow.

It has been found that the growth of animals can be accelerated by providing in the various commercial animal feed compositions certain amounts of 1-(p-chlorobenzhydroyl)-4-methylpiperazine hydrochloride. The addition of this compound appears to stimulate the appetite of the animal and thereby cause an increase in weight and growth. This effect is observed by the fact that animals given a diet to which Di-Paralene is added, eat more of the diet than do those given a normal basal diet. As will be illustrated in the following examples, the size and breed of the animal is determinative as to the amount of Di-Paralene administered.

The following examples are given to illustrate the invention, but is should be understood that they are not intended to limit the invention in any way.

*Example I*

Thirty 1-day-old cockerels of the White Rock variety were fed a basal diet containing 10 gm./ton of Di-Paralene and at the end of a four-week feeding period, the average weight of the 30 chicks was 495.1 gm. per chick. Thirty other chicks of the same variety and age were fed a basal diet containing 100 gm./ton of Di-Paralene and at the end of a four-week feeding period, their average weight was 508.1 gm. per chick. The two groups fed Di-Paralene in the above amounts showed a marked increase in weight over a control group of thirty other chicks of the same variety and age for a four-week feeding period which had an average weight of only 475.7 gm. per chick.

The basal diet used in this experiment is composed as follows:

| Components | Per 75 Lbs. |
|---|---|
| | Lbs. |
| A. Yellow Corn, ground (grade No. 2) | 45.43 |
| B. Hulled soybean oil meal, 50% protein | 19.48 |
| C. Alfalfa meal, 17% protein | 1.50 |
| D. Mineral pre-mix, Limestone Products [1] | 2.59 |
| E. Salt | .38 |
| F. Vitamin pre-mix, Dawe's [2] | 5.62 |
| Total | 75.00 |

[1] Limestone products mineral pre-mix:

| Components— | Lbs |
|---|---|
| Calcium Carbonate | 1.20 |
| Dicalcium phosphate | 1.31 |
| Trace Mineral Pre-mix* | .08 |
| Total | 2.59 |

*Trace mineral pre-mix analysis:

| Mineral | Percent | Present As— |
|---|---|---|
| Mn | 6.0 | Manganese oxide. |
| I | .12 | Potassium iodide. |
| Fe | 2.0 | Ferrous carbonate. |
| Cu | .2 | Calcium Hydroxide. |
| Zn | .006 | Impurity. |
| Cu | .02 | Cobalt carbonate. |
| Ca | 27.00 | Calcium carbonate and Calcium stearate. |

[2] Dawe's vitamin pre-mix:

| Components— | | Per 75 lbs. |
|---|---|---|
| Condensed fish solubles | lbs | 25.0 |
| Dried Whey product, 67% lactose | lbs | 25.0 |
| Soybean oil meal | lbs | 20.5 |
| DL mentionine | lbs | 0.5 |
| Vitamin A stabilized 4000 I.U./gm | lbs | 2.0 |
| Vitamin $D_3$, 1500 I.U./gm | lbs | 0.5 |
| Choline Chloride, 25% mix | lbs | 1.5 |
| Riboflavin | gms | 1.5 |
| Calcium pantothenate, racemic | gms | 5.0 |
| Niacin | gms | 15.0 |
| Vitamin $B_{12}$, Merck oral grade, 1 mg./gms | gms | 3.0 |
| Vitamin E acetate, Myvamix 20,000 I.U./lb | gms | 45.4 |
| Menadione | gms | 1.0 |
| Total | lbs | 75 |

*Example II*

Ten New Zealand white rabbits which were about six months old were fed a basal diet containing 360 gm./ton of Di-Paralene for 41 days and 428 gm./ton for an additional 44 days. Ten rabbits of the same variety and age were fed a regular basal diet for a corresponding 85-day period. The average weight of both groups of rabbits was recorded at certain intervals and also at the end of the 85-day period the results of which are shown in the following table:

BASAL DIET VS. BASAL PLUS DI-PARALENE

| Average Wt. of Rabbit at | 0 Days | 22 Days | 43 Days | 64 Days | 85 Days |
|---|---|---|---|---|---|
| Basal Diet kg | 1.76 | 1.60 | 1.58 | 1.60 | 1.78 |
| Basal and Di-Paralene Diet kg | 1.78 | 1.80 | 1.87 | 1.90 | 1.91 |

The above table illustrates that at periodic intervals at which average weights were taken and at the end of an 85-day period, the rabbits which had their diet supplemented with Di-Paralene grew faster than did those which had the regular basal diet, particularly during the early part of the period the basal diet is composed as follows:

| Components | Percent |
|---|---|
| Alphacel | 10.0 |
| Casein | 25.0 |
| White Dextrin | 39.9 |
| Hydrol (Hydrogenated) Coconut Oil | 20.0 |
| Macro Mineral Mixture [1] | 5.0 |
| Minor Mineral Mixture [2] | 0.1 |
| Total | 100.0 |

[1] Macro minerals mixture:

| Components | Gms. |
|---|---|
| $Ca_3(C_6H_5O_7)_2 \cdot 4H_2O$ | 308.2 |
| $Ca(H_2PO_4)_2$ | 104.7 |
| $K_2HPO_4$ | 218.7 |
| $KCl$ | 124.7 |
| $NaCl$ | 77.0 |
| $CaCO_3$ | 68.5 |
| $3MgCO_3 \cdot Mg(OH)_2 \cdot 3H_2O$ | 35.1 |
| $MgSO_4$ | 38.3 |

[2] Minor minerals mixture:

| Components | Gms. |
|---|---|
| $FeC_6H_5O_7 \cdot 5H_2O$ | 453.85 |
| $CuSO_4 \cdot 5H_2O$ | 28.15 |
| $MnSO_4 \cdot H_2O$ | 16.5 |
| $KI$ | 1.5 |

To the basal diet the following vitamins were added per 100 gm. of the basal diet:

| Components | | Amount |
|---|---|---|
| Thiamin.HCl | mg | 0.07 |
| Riboflavin | mg | 0.6 |
| dl-ca-pantothenate | mg | 1.5 |
| Pyridoxin.HCl | mg | 0.7 |
| Niacin | mg | 20.0 |
| Choline Chloride | mg | 100.0 |
| Betaine Chloride | mg | 100.0 |
| Inositol | mg | 10.0 |
| Para-Aminobenzoic Acid | mg | 0.2 |
| Folic Acid | mg | 0.1 |
| D-Biotin | mg | 0.05 |
| Vitamin A acetate | I.U. | 665 |
| Vitamin D$_2$ | I.U. | 850 |
| Vitamin E | I.U. | 7.5 |
| Vitamin B$_{12}$ | mg | 0.005 |
| Menadione | mg | 0.075 |

*Example III*

Six white mice which were about six weeks old were fed a basal diet containing 240 gm./ton of Di-Paralene. Another group of six white mice of the same age were fed a plain basal diet. The average weight of both groups of mice was recorded at intervals and at the end of a 71-day period the results of which are shown in the following table:

BASAL DIET VS. BASAL DIET PLUS DI-PARALENE

| Total Wt. of Mice at | 0 Days | 15 Days | 24 Days | 30 Days | 36 Days | 41 Days | 50 Days | 68 Days | 71 Days |
|---|---|---|---|---|---|---|---|---|---|
| Basal diet gm | 153 | 164 | 172 | 163 | 160 | 164 | 163 | 182 | 187 |
| Basal and Di-Paralene Diet gm | 152 | 175 | 194 | 187 | 191 | 200 | 209 | 211 | 210 |

The above table illustrates that at periodic intervals at which the average weights of the mice were taken as well as at the end of a 71-day period the mice which were fed Di-Paralene grew at a much greater rate than did those which were fed the basal diet alone.

The basal diet used in this experiment was a standard ground form of mouse feed sold under the name "Rockland" and is composed of the following:

AVERAGE ANALYSIS

| Components | Percent |
|---|---|
| Protein | 21.93 |
| Fat | 3.15 |
| Fiber | 4.86 |
| Carbohydrates | 56.23 |
| Nitrogen Free Extract | 52.59 |
| Ash | 7.78 |

The results of the above three tests made on chickens, rabbits, and mice show that growth is accelerated in animals when Di-Paralene is added to the diet in amounts sufficient to stimulate the appetite of the individual species.

It should be understood that this invention is meant to include the administration of Di-Paralene in forms other than as a solid in feed mixes, thus, for example, the growth of animals can be promoted by adding Di-Paralene to their drinking water. Growth is best promoted when about 1 to 10 gm. of Di-Paralene is added for every 50 gallons of water.

Satisfactory pre-mixes of Di-Paralene may be made with a variety of naturally occurring materials and with any desired concentration of Di-Paralene. Examples of suitable pre-mixing agents are soybean oil meal, ground limestone, oyster shell flour, corn meal, soybean mill feed, ground milo maize, and other grains and feed ingredients. An example of the preparation of a pre-mix containing 50 grams of Di-Paralene per pound of pre-mix is as follows:

Ten pounds of Di-Paralene, U.S.P. are weighed and placed in a suitable container. Eighty and eight-tenths pounds of solvent extracted soybean oil meal are weighed and placed in another container. Approximately ten pounds of the soybean oil meal are placed in the container with the Di-Paralene and the two are mixed manually by stirring with a spatula or other instrument. This mixture and the remainder of the soybean oil meal are then placed in a mixer of suitable capacity. Mixing time may vary from five minutes to an hour depending on the design of the mixer. Paddle, twin-shell, double cone, ribbon, vertical screw and other types of mixers may be used. This procedure produces 90.8 pounds of a pre-mix containing 50 grams of Di-Paralene per pound. These amounts may be increased or decreased depending on the size mixer used, the amount of pre-mix desired and the concentration of Di-Paralene to be achieved. Other pre-mixing agents may be substituted for the soybean oil meal used in this illustration. For certain pre-mixing agents the Di-Paralene may be dissolved in water or ethyl alcohol-water mixtures before mixing.

Others may practice the invention in any of the numerous ways which will be suggested by this disclosure to one skilled in the art. All such practice of the invention is considered to be a part hereof provided it falls within the scope of the appended claims.

We claim:

1. The method of increasing the rate of growth of warm-blooded vertebrate animals comprising orally administering to warm-blooded vertebrate animals a non-toxic 1-(p-chlorobenzhydryl)-4-methylpiperazine salt by the addition of said salt to said animals drinking water in amounts between about 1 to 10 gm. of said compound per 50 gallons of water whereby growth of said animals is accelerated.

2. The method of increasing the rate of growth of poultry comprising orally administering to poultry a poultry feed containing between about 10 to 100 gm. of 1 - (p-chlorobenzhydryl)-4-methylpiperazine hydrochloride per ton of poultry feed.

3. The method of increasing the rate of growth of chickens comprising orally administering to chickens a chicken feed containing between about 10 to 100 gm. of 1-(p-chlorobenzhydryl)-4-methylpiperazine hydrochloride per ton of chicken feed.

4. The method of increasing the rate of growth of rabbits comprising orally administering to rabbits a rabbit feed containing between about 360 to 428 gm. of 1-(p-chlorobenzhydryl)-4-methylpiperazine hydrochloride per ton of rabbit feed.

5. The method of increasing the rate of growth of mice comprising orally administering to mice a mouse feed containing about 240 gm. of 1-(p-chlorobenzhydryl)-4-methylpiperazine hydrochloride per ton of feed.

6. A novel poultry feed composition comprising a poultry feed having dispersed therein about 10 to 100 gm. of 1-(p-chlorobenzhydryl)-4-methylpiperazine hydrochloride per ton of feed.

7. The method of increasing the rate of growth of warm-blooded vertebrate animals which comprises orally administering to said animals a composition selected from the group consisting of an animal feed containing between about 10–428 gm. of a non-toxic 1-(p-chlorobenzhydryl)-4-methylpiperazine salt per ton of said animal feed and drinking water containing between about 1–10 gm. of said salt per 50 gallons of said water, whereby the growth of said animals is accelerated.

8. A novel animal feed composition comprising an orally acceptable ingredient for an animal feed for warm blooded vertebrate animals having dispersed therein between about 10 to 428 gm. of a non-toxic 1-(p-chlorobenzhydryl)-4-methylpiperazine salt per ton of said feed.

9. The method of increasing the rate of growth of poultry comprising orally administering to poultry a poultry feed containing between about 10 to 100 gm. of a non-toxic 1-(p-chlorobenzhydryl)-4-methylpiperazine salt per ton of said poultry feed whereby growth of said animals is accelerated.

References Cited in the file of this patent

U.S. Dispensatory 25th ed. (1955), Part II–III, page 1942.

Drug & Cosmetic Ind., June 1956, 78, pp. 823 and 825.

Du Pont–Agri. News Letter, summer 1957, pp. 3 and 4.

Lancet: 11, October 1957, pp. 804–5.

Jr. Animal Science 16, November 1957, page 1020.